US007308389B2

(12) United States Patent
Sawai et al.

(10) Patent No.: US 7,308,389 B2
(45) Date of Patent: Dec. 11, 2007

(54) METHOD OF PREDICTING SHAPE OF WIRE-LIKE STRUCTURE, ITS APPARATUS AND ITS PROGRAM

(75) Inventors: Masayoshi Sawai, Kosai (JP); Akiko Nakano, Kosai (JP)

(73) Assignee: Yazaki Corporation, Tokyo (JP)

( * ) Notice: Subject to any disclaimer, the term of this patent is extended or adjusted under 35 U.S.C. 154(b) by 650 days.

(21) Appl. No.: 10/715,850

(22) Filed: Nov. 19, 2003

(65) Prior Publication Data
US 2004/0172151 A1    Sep. 2, 2004

(30) Foreign Application Priority Data
Nov. 19, 2002 (JP) ............ P2002-334940
Sep. 1, 2003 (JP) ............ P2003-308508

(51) Int. Cl.
*G06G 7/48* (2006.01)
*G06F 7/60* (2006.01)
*G06F 19/00* (2006.01)

(52) U.S. Cl. ............ 703/6; 703/2; 700/95; 700/97
(58) Field of Classification Search ............ 703/6; 700/95
See application file for complete search history.

(56) References Cited

U.S. PATENT DOCUMENTS 6,813,749 B2 *  11/2004  Rassaian ............ 716/4
6,839,642 B2 *   1/2005  Kawakita et al. ........ 702/42

FOREIGN PATENT DOCUMENTS

| EP | 1 130 527 A | 9/2001 |
|---|---|---|
| EP | 1 236 989 A | 9/2002 |
| JP | 2001-250438 A | 9/2001 |
| JP | 2001-251740 A | 9/2001 |
| JP | 2001-251741 A | 9/2001 |
| JP | 2002-231074 A | 8/2002 |
| JP | 2002-260459 A | 9/2002 |
| JP | 2002-260460 A | 9/2002 |

OTHER PUBLICATIONS

Morita et al., "Numerical Model of Crimping by Finite Element Analysis" 1996 IEEE p. 16-20.*
Hillerin DE C-A: "Use of The FEM For The Design of Flexible Parts", Proceedings of NAFEMS World Congress, XX, XX, vol. 1, Apr. 25, 1999, pp. 345-356, XP009052130.
Alibozek T: "Smart Software Builds a Better Harness", Machine Design, Penton Media, Cleveland, OH, US, vol. 70, No. 8, May 7, 1998, pp. 89-92, XP001092826.

* cited by examiner

*Primary Examiner*—Anthony Knight
*Assistant Examiner*—Thomas H. Stevens
(74) *Attorney, Agent, or Firm*—Sughrue Mion, PLLC

(57) ABSTRACT

A wire harness constituted by bundling a plurality of pieces of line streak members by a predetermined exterior member is regarded to be an elastic body having a circular shape and coupled with a plurality of beam elements maintaining a linearity to form a model and a shape of the wire harness is predicted by utilizing a finite element method. When an end portion of the wire harness is displaced by an input apparatus, a shape $1c$ physically in equilibrium is automatically calculated by the finite element method and is drawn again. That is, the shape physically in equilibrium is automatically calculated and drawn by following a shape design by well-known operation by CAD at a background thereof.

6 Claims, 11 Drawing Sheets

FIG. 2

| CONSTRAINED DEGREE OF FREEDOM / SUPPORTING MEMBER | | X-AXIS DIRECTION TRANSLATION | Y-AXIS DIRECTION TRANSLATION | Z-AXIS DIRECTION TRANSLATION | ROTATION AROUND X-AXIS | ROTATION AROUND Y-AXIS | ROTATION AROUND Z-AXIS |
|---|---|---|---|---|---|---|---|
| COMPLETELY CONSTRAINED | CONNECTOR | IMPOSSIBLE | IMPOSSIBLE | IMPOSSIBLE | IMPOSSIBLE | IMPOSSIBLE | IMPOSSIBLE |
| COMPLETELY CONSTRAINED | LONG HOLE CLIP | IMPOSSIBLE | IMPOSSIBLE | IMPOSSIBLE | IMPOSSIBLE | IMPOSSIBLE | IMPOSSIBLE |
| ROTATABLY CONSTRAINED | ROUND HOLE CLIP | IMPOSSIBLE | IMPOSSIBLE | IMPOSSIBLE | IMPOSSIBLE | IMPOSSIBLE | POSSIBLE |
| ROTATABLY CONSTRAINED | CORRUGATED LONG HOLE CLIP | IMPOSSIBLE | IMPOSSIBLE | IMPOSSIBLE | POSSIBLE | IMPOSSIBLE | IMPOSSIBLE |
| ROTATABLY CONSTRAINED | CORRUGATED ROUND HOLE CLIP | IMPOSSIBLE | IMPOSSIBLE | IMPOSSIBLE | POSSIBLE | IMPOSSIBLE | POSSIBLE |
| COMPLETELY CONSTRAINED | BRANCH POINT | POSSIBLE | POSSIBLE | POSSIBLE | POSSIBLE | POSSIBLE | POSSIBLE |

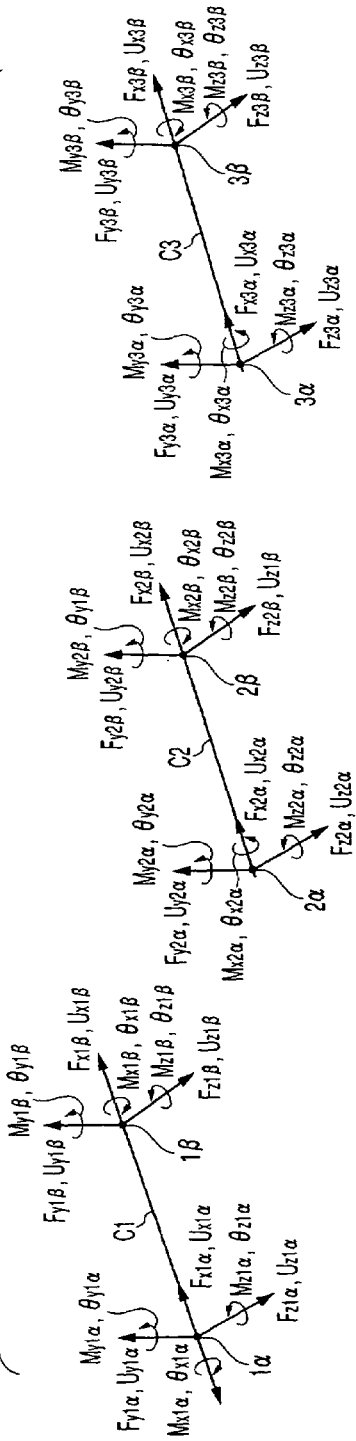
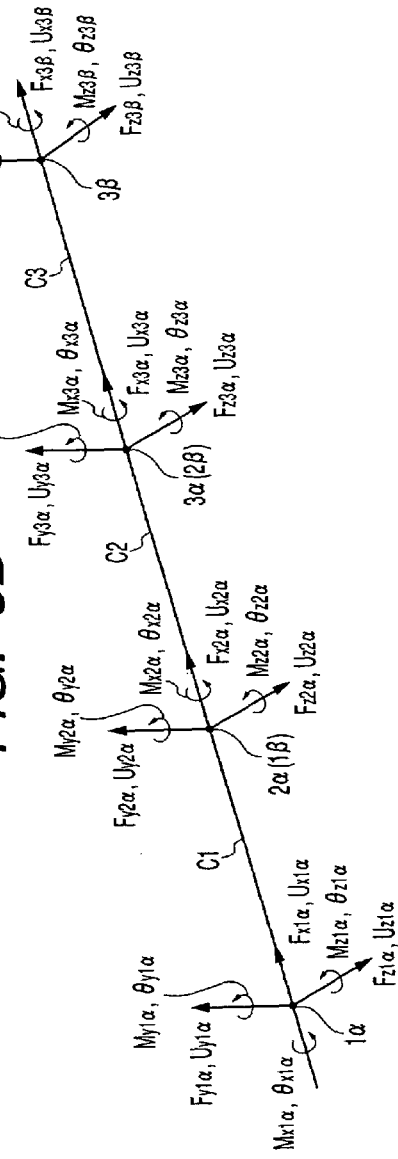
FIG. 5A
FIG. 5B

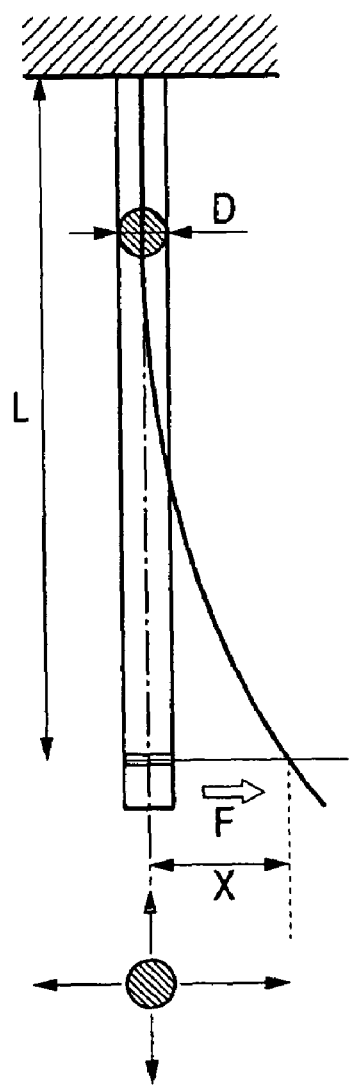
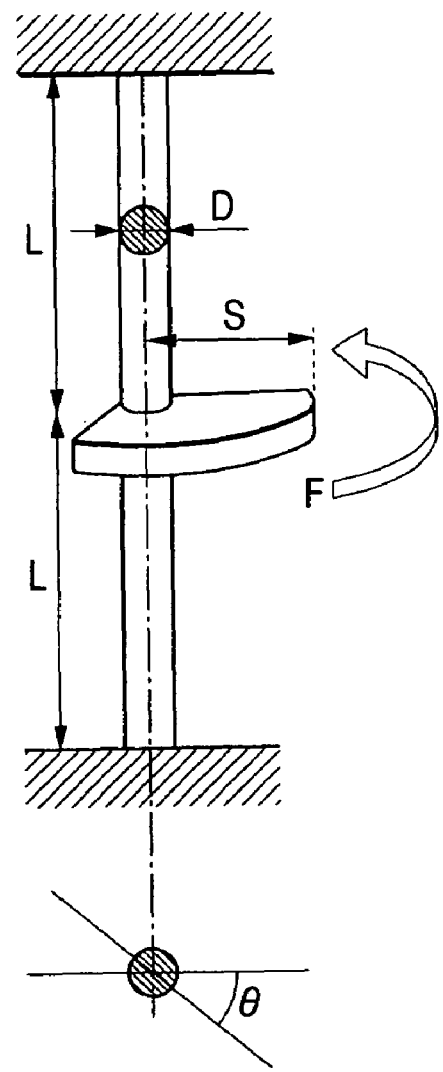
FIG. 6A
FIG. 6B

FIG. 7

| EXTERIOR TYPE | W/H DIAMETER 1-5 | W/H DIAMETER 6-10 | W/H DIAMETER 11-15 | ... |
|---|---|---|---|---|
| NO EXTERIOR | 10 | 12 | 14 | ... |
| TYPE-WOUND 1 | 20 | ... | ... | ... |
| TYPE-WOUND 2 | 30 | ... | ... | ... |
| ... | ... | ... | ... | ... | ns_ in which a plurality of beam elements a linearity of which is maintained are coupled with each other

METHOD OF PREDICTING SHAPE OF WIRE-LIKE STRUCTURE, ITS APPARATUS AND ITS PROGRAM

BACKGROUND OF THE INVENTION

The present invention relates to a method of assisting a wiring design of a wire-like structure constituted by a plurality of line streak members, its apparatus and its program, particularly to a method, an apparatus and a program of assisting an optimum wiring design of a wire harness wired at a vehicle as a wire-like structure.

Normally, at a vehicle or the like, a plurality of electrical equipments are mounted thereon, and the electrical equipments are connected by a so-to-speak wire harness in which a plurality of electric wires or communication lines are bundled by a bundling member of an insulock or the like or a protective member of a tape or the like as the line streak members. As shown by FIG. 1, a wire harness 1 is attached with connectors 2a, 2b, 2c and 2d respective end portions of which are connected to electrical equipments or the like. Further, various clips 3a, 3b, 3c, 3d are attached to middle portions thereof, further, a branch point 4 is provided thereto. Further, respective branch lines of the wire harness 1 constituting from the respective end portions to the branch point 4 are basically provided with different numbers and kinds of constituent line streak members and therefore, the respective branch lines are provided with various boldnesses, lengths, elasticities, rigidities and the like. Further, in a prior art, a wiring design of such a wire harness is frequently carried out mainly by hunch and experience of a designer.

Recently, shape prediction and path design of such a wire harness is widely conducted by using a computer support system. As a basic technique thereof, a CAD (Computer Aided Design) and a general-purpose analysis software such as CAE (Computer Aided Engineering) are combined and utilized. That is, a detailed shape of wire harness to which boldness, length type and the like are reflected is designed by the CAD, and thereafter the shape prediction is calculated by inputting required data by number into predetermined general-purpose CAE. After evaluating the calculating result, The CAD designs the predicted shape again. Such a cycle is repeated by designers who are skilled in operation of CAD and general-purpose CAE.

A literature cited in the specification will be shown here as follows.

"Matrix finite element method" by B. Nas, Brain Publishing Co., Aug. 10, 1978, p. 7-15

However, the following problem is posed in designing a path by repeatedly using CAD and general purpose CAE as in the prior art. That is, CAD and general purpose CAE are separated in software and therefore, numerical values necessary for general purpose CAE need to input at a number of times. Further, operation of inputting the necessary numerical values is also complicated and enormous time is required for leaning a technique of mastering general purpose CAE. Further, according to general purpose CAE, there also poses a problem that lead time for simulating deformation of a wire harness, that is, a time period required for predicting a shape thereof is much prolonged.

SUMMARY OF THE INVENTION

Therefore, in view of the above-described current state, it is a problem of the invention to provide a method of predicting a shape of a wire-like structure, its apparatus and its program for enabling to predict a desired shape firmly in a short period of time while dispensing with learning of a special technology and skill.

In order to solve the aforesaid object, the invention is characterized by having the following arrangement.

(1) A method of predicting, by utilizing a finite element method, a shape of a wiring structure in which the wiring structure constituted by a line streak member covered by an exterior member is regarded as an elastic body in which a plurality of beam elements a linearity of which is maintained are coupled with each other, the method comprising:

a drawing step of drawing the wiring structure having an arbitrary shape by a manual operation;

a shape characteristic extracting step of extracting shape characteristic from the drawn wiring structure;

a constraining condition extracting step of extracting constraining condition from the drawn wiring structure;

a material characteristic calculating step of calculating material characteristic of the drawn wiring structure based on the drawn wiring structure; and a predicted shape calculating step of calculating a predicted shape which is brought into a physical equilibrium state by applying the shape characteristic, the constraining condition and the material characteristic to the finite element method.

(2) The method according to (1), wherein a characteristic table representing relationships among type, boldness and material characteristic of the exterior member is previously stored, and wherein the material characteristic calculating step calculates the material characteristic of the drawn wiring structure by applying type and boldness of the exterior member calculated based on the drawn wire harness to the characteristic table.

(3) The method according to (2), wherein in the characteristic table, longitudinal modulus of elasticity or transverse modulus of elasticity of the exterior member is treated as the material characteristic of the exterior member.

(4) The method according to (1) further comprising:

an alarm outputting step of outputting an alarm when it is determined that the predicted shape which is brought into the physical equilibrium state is impossible to be calculated based on the wiring structure drawn according to the manual operation.

(5) An apparatus of predicting, by utilizing a finite element method, a shape of a wiring structure in which the wiring structure constituted by a line streak member covered by an exterior member is regarded as an elastic body in which a plurality of beam elements a linearity of which is maintained are coupled with each other, the apparatus comprising:

a drawing unit for drawing the wiring structure having an arbitrary shape by a manual operation;

a shape characteristic extracting unit for extracting shape characteristic from the drawn wiring structure;

a constraining condition extracting unit for extracting constraining condition from the drawn wiring structure;

a material characteristic calculating unit for calculating material characteristic of the drawn wiring structure based on the drawn wiring structure; and a predicted shape calculating unit for calculating a predicted shape which is brought into a physical equilibrium state by applying the shape characteristic, the constraining condition and the material characteristic to the finite element method.

(6) A computer readable recording medium storing a program which cause a computer to function as an apparatus of predicting, by utilizing a finite element method, a shape of a wiring structure in which the wiring structure constituted by a line streak member covered by an exterior member is regarded as an elastic body which has a circular section and in which a plurality of beam elements a linearity of which is maintained are coupled with each other, the program causing the computer to function as:

a drawing unit for drawing the wiring structure having an arbitrary shape by a manual operation;

a shape characteristic extracting unit for extracting shape characteristic from the drawn wiring structure;

a constraining condition extracting unit for extracting constraining condition from the drawn wiring structure;

a material characteristic calculating unit for calculating material characteristic of the drawn wiring structure based on the drawn wiring structure; and a predicted shape calculating unit for calculating a predicted shape which is brought into a physical equilibrium state by applying the shape characteristic, the constraining condition and the material characteristic to the finite element method.

BRIEF DESCRIPTION OF THE DRAWINGS

FIG. 2 is a diagram showing a relationship between representative supporting members for supporting the wire harness and constrained degrees of freedom.

FIG. 5A is a diagram expressing the wire harness by three beam elements and FIG. 5B is a diagram showing a state of coupling the three beam elements of FIG. 5A.

FIG. 6A is a view showing a behavior of measuring a moment of inertia and a longitudinal modulus of elasticity and FIG. 6B is a view showing a behavior of measuring a polar moment of inertia and a transverse modulus of elasticity.

FIG. 7 is a diagram showing an example of a characteristic table.

DETAILED DESCRIPTION OF PREFERRED EMBODIMENTS

Figure 1:
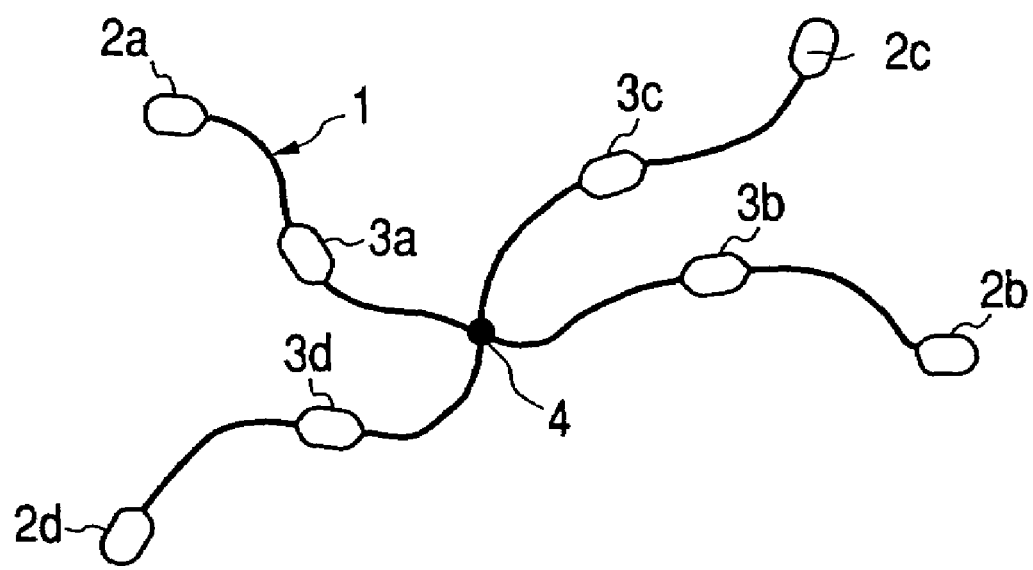
FIG. 1 is a view showing an outline of a total shape of a wire harness constituting an object according to the invention.

An embodiment of the invention will be explained in reference to drawings as follows. First, an explanation will be given of a total shape of a wire harness as a wiring structure constituting an object of design and representative supporting members in reference to FIG. 1 and FIG. 2. FIG. 1 is a view showing an outline of the total shape of the wire harness constituting the object of design according to the embodiment of the invention. FIG. 2 is a diagram showing a relationship between the representative supporting members for supporting the wire harness and constrained degrees of freedom.

As described above, the wire harness 1 constituting the object of design according to the embodiment is attached with four connectors 2a, 2b, 2c, 2d both end portions of which are connected with electrical equipments, not illustrated, attached with the various clips 3a, 3b, 3c and 3d at middle portions thereof and is provided with the branch point 4. The respective branch lines of the wire harness 1 are basically provided with different numbers and kinds of respective constituent line streak members and therefore, the respective branch lines are provided with different boldnesses, lengths, elasticities, rigidities and the like.

The respective connectors 2a, 2b, 2c and 2d are attachably and detachably fixed at predetermined positions in accordance with fixed positions and mounting directions of opposed side connectors on sides of the electrical equipments to completely constrain end portions of the wire harness. Further, the respective clips 3a, 3b, 3c, 3d completely constrain or rotatably constrain predetermined portions of the wire harness at predetermined positions of cabinets, stays or the like of the electrical equipments.

Here, an explanation will be given of the clips. In the clips, basically, there are long hole clips and round hole clips. The round hole clip is referred to also as rotational clip and is constituted by a base seat portion holding the wire harness and a support leg inserted into an attaching hole in a shape of a round hole provided at the stay or the like. The round hole clip is rotatable around Z-axis (in a direction orthogonal to an attaching portion).

Meanwhile, the long hole clip is referred to also as fixed flip and is constituted by a base seat portion holding the wire harness and a support leg inserted into an attaching hole in a shape of a long hole provided at the stay or the like. A sectional shape of the support leg is constituted by a shape of a long hole substantially similar to that of the attaching hole. The long hole clip is not rotatable around Z-axis.

Further, in the long hole clip and the round hole clip, there are a corrugated long hole clip and a corrugated round hole clip rotatable around X-axes (in a longitudinal direction of the wire harness). Constrained degrees of freedom of the respective clips in respective axial directions and around respective axes are as shown by FIG. 2.

In FIG. 2, X-axis, Y-axis and Z-axis correspond to three axes orthogonal to each other in a right hand local coordinates system at respective node points (or also referred to as nodes) on the wire harness. Although for example, Z-axis is made to coincide with a clip axis, a method of determining the axes can pertinently be changed in accordance with a function used. Further, in the drawing, constrained degrees of freedom of the branch point are also shown for reference. Further, a node point on the wire harness arbitrarily set other than the above-described constrained points is basically completely free although not illustrated here. The constrained degrees of freedom are respectively set to the respective nodes prior to calculating a predicted path, a reaction force or the like as described later.

Figure 3A:
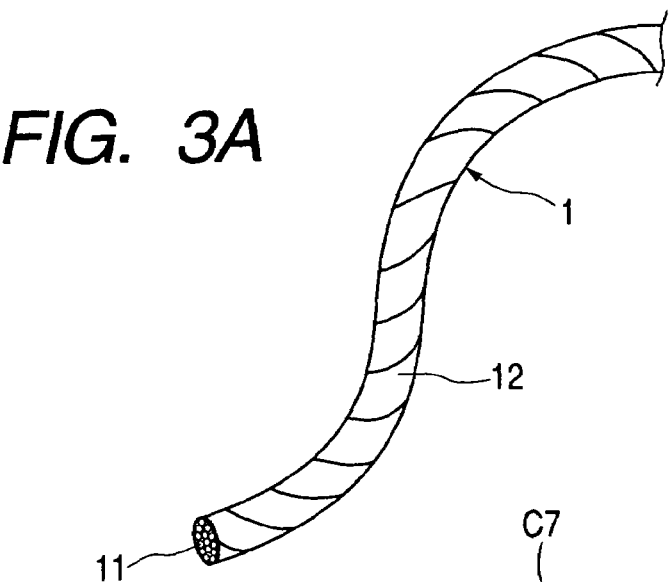
FIG. 3A is a view showing an outlook of the wire harness.
Figure 3B:
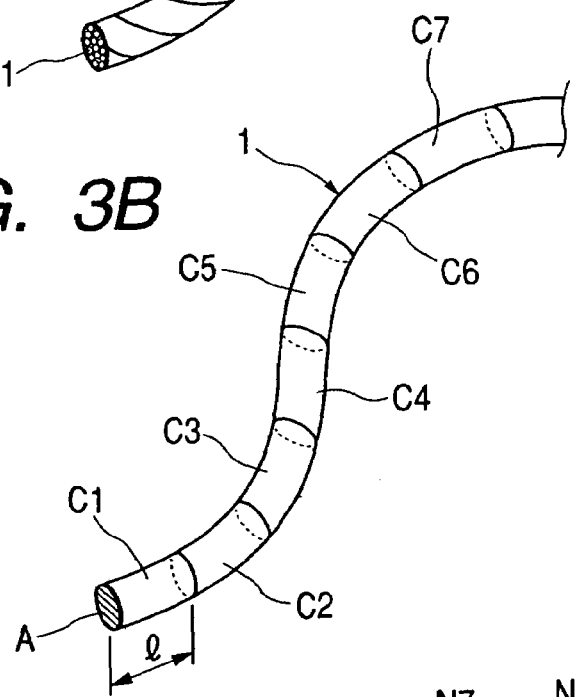
FIG. 3B is a view showing a behavior of digitizing the wire harness of FIG. 3A
Figure 3C:
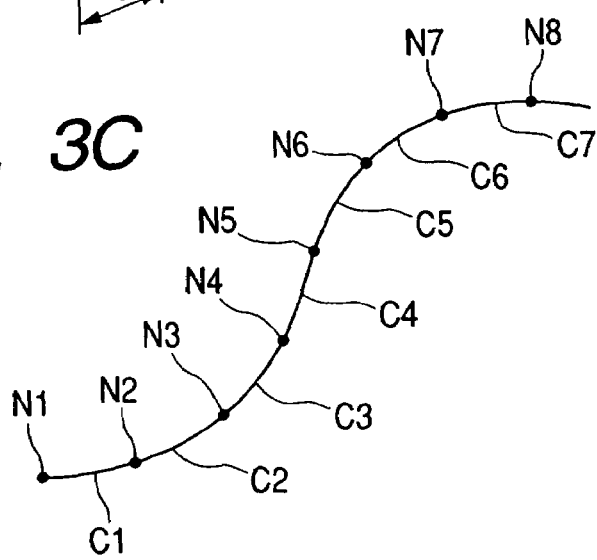
FIG. 3C is a view expressing the wire harness of FIG. 3A by a beam element and a node point.
Figure 4:
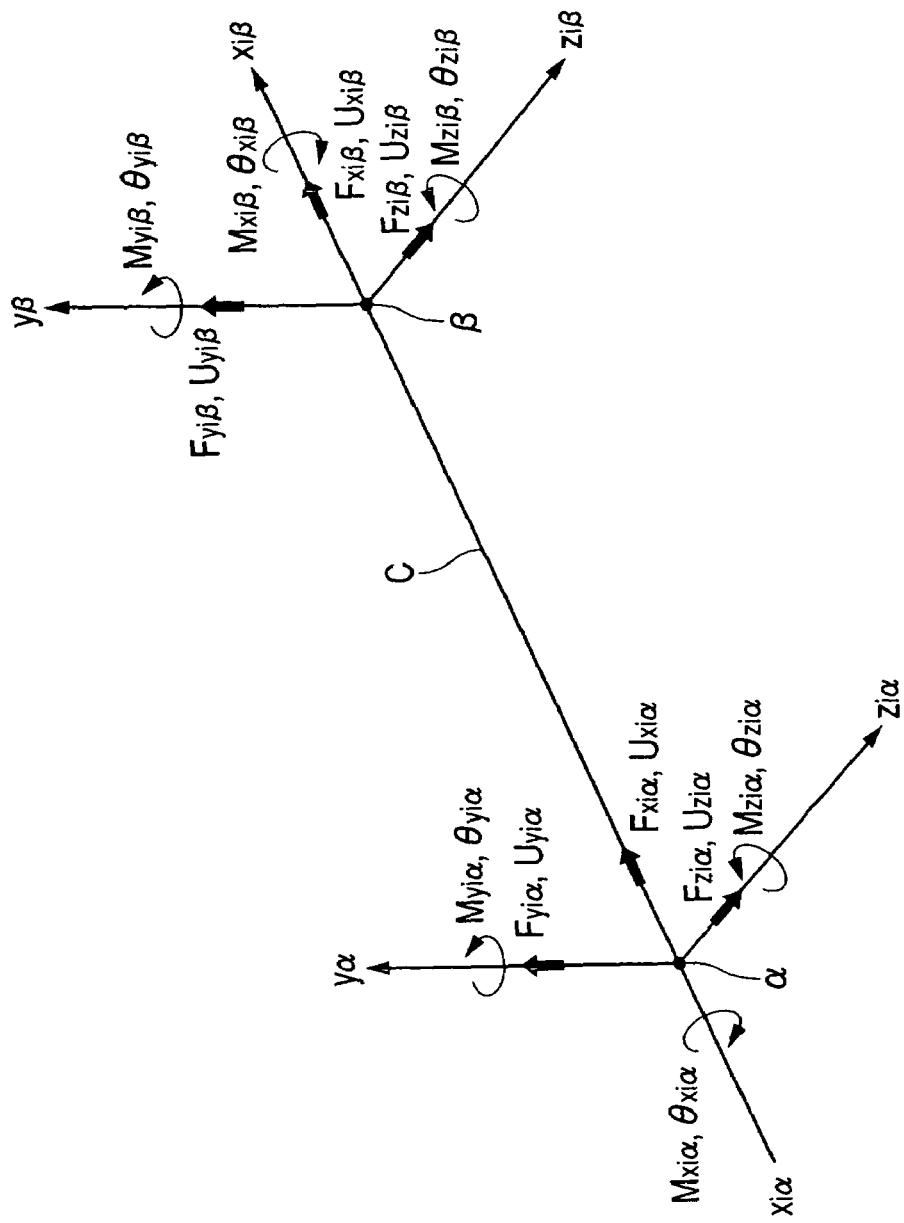
FIG. 4 is a diagram for explaining a degree of freedom of the wire harness expressed by the beam element and the node point.

Next, an explanation will be given of outlines of assuming conditions constituting a premise, a utilized theory and basic equations in reference to FIG. 3 through FIG. 6. FIG. 3(A) is a view showing an outlook of the wire harness, FIG. 3(B) is a view showing a state of digitizing the wire harness, and FIG. 3(C) is a view showing the wire harness of FIG. 3(A) by beam elements and node points. FIG. 4 is a view for explaining degrees of freedom of the wire harness shown by the beam elements and the node points. FIG. 5(A) is a view showing the wire harness by three beam elements and FIG. 5(B) is a view showing a state of coupling three of the beam elements of FIG. 5(A).

First, according to the embodiment, in utilizing a finite element method in designing the wire harness, it is assumed as follows.

(1) The wire harness is assumed to be an elastic body.

(2) The wire harness is assumed to be coupled with beam elements.

(3) It is assumed that linearity is maintained at each beam element.

(4) A section of the wire harness is assumed to be circular.

By assuming in this way in this embodiment, application of the finite element method to the wire harness which has not been carried out, can be carried out.

According to the embodiment, first, the wire harness is digitized. That is, as shown by FIG. 3(A), the wire harness 1 in which a plurality of electric wires 11 are bundled by a protective member of a tape 12 or the like can be regarded as a continuous body. Next, as shown by FIG. 3(B), the wire harness 1 is divided (digitized) into a number of beam elements C1, C2, C3, . . . . That is, since the wire harness is like a single piece of rope and therefore, the wire harness can be regarded to be connected with a finite number of pieces of the beam elements.

Therefore, as shown by FIG. 3(C), the wire harness can be represented by coupling the plurality of beam elements C1, C2, C3, . . . by a plurality of nodes N1, N2, N3, . . . . Characteristic values necessary for the beam element are as follows.

length l (refer to FIG. 3(B))
sectional area A (refer to FIG. 3(B))
moment of inertia I
polar moment of inertia J
density ρ
longitudinal modulus of elasticity E
transverse modulus of elasticity G Further, in the specification, shape characteristics are constituted by the length l and the sectional area A and material characteristic are constituted by the moment of inertia I, the polar moment of inertia J, the density ρ, the longitudinal modulus of elasticity E and the transverse modulus of elasticity although a description thereof will be given later.

Further, as shown by FIG. 4, each beam element C (C1, C2, C3, . . . ) is provided with two of a node point α and a node point β. In a three-dimensional space, the node point α is provided with 3 of translation components and 3 of rotation components and therefore, the node point α is provided with a total of 6 degrees of freedom. Further, the same goes with the node point β. Therefore, the beam element C is provided with 12 degrees of freedom.

Further, in the drawing, $F_{xi}$: force in xi-axis direction of i-th element
$F_{yi}$: force in yi-axis direction of i-th element
$F_{zi}$: force in zi-axis direction of i-th element
$M_{xi}$: moment around xi-axis of i-th element
$M_{yi}$: moment around yi-axis of i-th element
$M_{zi}$: moment around zi-axis of i-th element
$U_{xi}$: displacement in xi-axis direction of i-th element
$U_{yi}$: displacement in yi-axis direction of i-th element
$U_{zi}$: displacement in zi-axis direction of i-th element
$\theta_{xi}$: angular displacement in xi-axis direction of i-th element
$\theta_{yi}$: angular displacement in yi-axis direction of i-th element
$\theta_{zi}$: angular displacement in zi-axis direction of i-th element
  notation α designates the node point on the left side and
  notation β designates the node point on the right side.

If the theory of structure for a structure involving a large change in shape such as wiring structure, balance equation of the finite element method is generally represented as follows:

$$(K+K_G)U=P$$

where:
K: rigid matrix
$K_G$: geometrical rigid matrix
U: displacement vector
P: load vector However, since the above equation is algebraically non-linear simultaneous equation, the equation cannot be solved in actual numerical analysis. Therefore, incremental methods in which a load value is subdivided and subdivisions are subsequently added are employed (also employed in case of forcibly displacement). Thus, the balance equation is represented by a following incremental form:

$$(K+K_G)\Delta U=\Delta P-R$$

where:
ΔU: value of displacement incremental
ΔP: incremental load at incremental step
R: compensation vector of incremental vector At each incremental section, the balance equation is regarded as linear equation and calculated. At this time, generated non-balance force (R at the equation) is decreased to an allowable range by an iteration method in advance to the next step. As series of these algorism, well-known method such as Newton-Raphson method, arc-length method and the like is utilized.

Incidentally, with respect to a subject of designating forcible deformation in the case of shape prediction, for example, since omitting the geometrical rigid matrix of the second term on the left side of the balance equation causes a good result in many cases, the present embodiment omits it.

Further, the rigid matrix the first term on the left side is a matrix in which elements of the rigid matrix, values of coordinates of each of which is rewritten and changed every moment according to each incremental step, are converted into global coordinates system and are collected. Specific representation of element rigid matrix as the basis of this is as following equation 1.

[Equation 1]

two node points are also balanced. Therefore, the beam elements C1 and C2 and the beam elements C2 and C3 can be coupled as shown by FIG. 5(B) by satisfying continuity of the displacements and the condition of equilibrium.

Further, in the drawing,
$F_{xi}$: force in xi-axis direction of i-th element
$F_{yi}$: force in yi-axis direction of i-th element
$F_{zi}$: force in zi-axis direction of i-th element
$M_{xi}$: moment around xi-axis of i-th element
$M_{yi}$: moment around yi-axis of i-th element
$M_{zi}$: moment around zi-axis of i-th element
$U_{xi}$: displacement in xi-axis direction of i-th element $$\begin{pmatrix} \frac{AE}{l} & 0 & 0 & 0 & 0 & 0 & -\frac{AE}{l} & 0 & 0 & 0 & 0 & 0 \\ 0 & \frac{12EI_z}{l^3} & 0 & 0 & 0 & \frac{6EI_z}{l^2} & 0 & -\frac{12EI_z}{l^3} & 0 & 0 & 0 & \frac{6EI_z}{l^2} \\ 0 & 0 & \frac{12EI_y}{l^3} & 0 & -\frac{6EI_y}{l^2} & 0 & 0 & 0 & -\frac{12EI_y}{l^3} & 0 & -\frac{6EI_y}{l^2} & 0 \\ 0 & 0 & 0 & \frac{GJ}{l} & 0 & 0 & 0 & 0 & 0 & -\frac{GJ}{l} & 0 & 0 \\ 0 & 0 & -\frac{6EI_y}{l^2} & 0 & \frac{4EI_y}{l} & 0 & 0 & 0 & \frac{6EI_y}{l^2} & 0 & \frac{2EI_y}{l} & 0 \\ 0 & \frac{6EI_z}{l^2} & 0 & 0 & 0 & \frac{4EI_z}{l} & 0 & -\frac{6EI_z}{l^2} & 0 & 0 & 0 & \frac{2EI_z}{l} \\ -\frac{AE}{l} & 0 & 0 & 0 & 0 & 0 & \frac{AE}{l} & 0 & 0 & 0 & 0 & 0 \\ 0 & -\frac{12EI_z}{l^3} & 0 & 0 & 0 & -\frac{6EI_z}{l^2} & 0 & \frac{12EI_z}{l^3} & 0 & 0 & 0 & -\frac{6EI_z}{l^2} \\ 0 & 0 & -\frac{12EI_y}{l^3} & 0 & \frac{6EI_y}{l^2} & 0 & 0 & 0 & \frac{12EI_y}{l^3} & 0 & \frac{6EI_y}{l^2} & 0 \\ 0 & 0 & 0 & -\frac{GJ}{l} & 0 & 0 & 0 & 0 & 0 & \frac{GJ}{l} & 0 & 0 \\ 0 & 0 & -\frac{6EI_y}{l^2} & 0 & \frac{2EI_y}{l} & 0 & 0 & 0 & \frac{6EI_y}{l^2} & 0 & \frac{4EI_y}{l} & 0 \\ 0 & \frac{6EI_z}{l^2} & 0 & 0 & 0 & \frac{2EI_z}{l} & 0 & -\frac{6EI_z}{l^2} & 0 & 0 & 0 & \frac{4EI_z}{l} \end{pmatrix} \begin{Bmatrix} U_{xi\alpha} \\ U_{yi\alpha} \\ U_{zi\alpha} \\ \theta_{xi\alpha} \\ \theta_{yi\alpha} \\ \theta_{zi\alpha} \\ U_{xi\beta} \\ U_{yi\beta} \\ U_{zi\beta} \\ \theta_{xi\beta} \\ \theta_{yi\beta} \\ \theta_{zi\beta} \end{Bmatrix} = \begin{Bmatrix} F_{xi\alpha} \\ F_{yi\alpha} \\ F_{zi\alpha} \\ M_{xi\alpha} \\ M_{yi\alpha} \\ M_{zi\alpha} \\ F_{xi\beta} \\ F_{yi\beta} \\ F_{zi\beta} \\ M_{xi\beta} \\ M_{yi\beta} \\ M_{zi\beta} \end{Bmatrix} \quad (2)$$

An explanation will be given here of a compatibility condition and a condition of equilibrium. Here, for simplicity, as shown by FIG. 5(A), the wire harness is represented by 3 of the beam elements C1, C2, C3. In this case, displacements of the node point 1β of the beam elements C1 and the node point 2α of the beam element C2 are equal to each other and forces applied to the two node points are also balanced. Similarly, also displacements of the node point 2β of the beam element C2 and the node point 3α of the beam element C3 are equal to each other and forces applied to the $U_{yi}$: displacement in yi-axis direction of i-th element
$U_{zi}$: displacement in zi-axis direction of i-th element
$\theta_{xi}$: angular displacement in xi-axis direction of i-th element
$\theta_{yi}$: angular displacement in yi-axis direction of i-th element
$\theta_{zi}$: angular displacement in zi-axis direction of i-th element
   and i=1α, 1β, 2α, 2β, 3α, 3β.

Further, when the continuity of the displacements and equilibrium of forces of the beam elements C1, C2, C3 shown in FIG. 5(B) are shown by a style similar to that of Equation (2) as mentioned above, Equation (3) is derived as follows.

[Equation 3]

$$\begin{pmatrix} \begin{matrix} M1 \\ & M12 \\ & & M2 \\ & & & M23 \\ & & & & M3 \end{matrix} \end{pmatrix} \begin{Bmatrix} Ux1\alpha \\ Uy1\alpha \\ Uz1\alpha \\ \theta x1\alpha \\ \theta y1\alpha \\ \theta z1\alpha \\ \cdots \\ Ux2\alpha \\ Uy2\alpha \\ Uz2\alpha \\ \theta x2\alpha \\ \theta y2\alpha \\ \theta z2\alpha \\ \cdots \\ Ux3\alpha \\ Uy3\alpha \\ Uz3\alpha \\ \theta x3\alpha \\ \theta y3\alpha \\ \theta z3\alpha \\ \cdots \\ Ux3\beta \\ Uy3\beta \\ Uz3\beta \\ \theta x3\beta \\ \theta y3\beta \\ \theta z3\beta \end{Bmatrix} = \begin{Bmatrix} Fx1\alpha \\ Fy1\alpha \\ Fz1\alpha \\ Mx1\alpha \\ My1\alpha \\ Mz1\alpha \\ \cdots \\ Fx2\alpha \\ Fy2\alpha \\ Fz2\alpha \\ Mx2\alpha \\ My2\alpha \\ Mz2\alpha \\ \cdots \\ Fx3\alpha \\ Fy3\alpha \\ Fz3\alpha \\ Hx3\alpha \\ Hy3\alpha \\ Hz3\alpha \\ \cdots \\ Fx3\beta \\ Fy3\beta \\ Fz3\beta \\ Mx3\beta \\ My3\beta \\ Mz3\beta \end{Bmatrix} \quad (3)$$

[K]       {x}       {F}

Here, matrices of 12 rows and 12 columns M1, M2 and M3 in Equation (3) are similar to those in shown in Equation (2). However, at the portions M12 and M13 at which the matrices M1, M2 and M3 overlap each other, respective constituent elements of the respective matrices are added together.

Further, 4 or more of the beam elements can similarly be dealt with. In this way, an equation model of a wire harness divided into an arbitrary number of beam elements can be formed.

Incidentally, Equation (3) is simply expressed as follows.

$$[K]\{x\}=\{F\} \quad (4)$$

Therefore, a predicted shape can be calculated by obtaining respective elements of the displacement vector {x} which are unknowns based on Equation (3) or Equation (4). In calculating a solution of Equation (3) or Equation (4), a well-known arc length method or positive solution method can be utilized. Further, the above-described general matrix finite element method is introduced in, for example, non-patent literature 1, mentioned above.

Next, an example of a way of calculating a longitudinal modulus of elasticity and a transverse modulus of elasticity necessary for predicting a shape according to the invention will be shown below. FIG. 6(A) is a view showing a behavior of measuring a moment of inertia and a longitudinal modulus of elasticity and FIG. 6(B) is a view showing a behavior of measuring a polar moment of inertia and a transverse modulus of elasticity. FIG. 7 is a diagram showing an example of a characteristic table.

Further, the longitudinal modulus of elasticity E can be represented by Equation (5), shown below, when a measuring method shown in FIG. 6(A) is carried out.

$$E=FL^3/3XI \quad (5)$$

Further, the moment of inertia I can be represented by Equation (6), shown below, since the wire harness is assumed to be constituted by a circular section as mentioned above.

$$I=\pi D^4/64 \quad (6)$$

Therefore, the following equation is established.

$$E=64FL^3/3X\pi D^4 \quad (7)$$

According to the measurement, a relationship between F and x may be measured by constituting the following equation.

$$E=(F/X)\times(64L^3/3\pi D^4)$$

Meanwhile, according to the invention, the longitudinal modulus of elasticity E is calculated for each kind and each boldness of an exterior member. That is, as shown by FIG. 7, the longitudinal modulus of elasticity E is calculated as described above for each of boldnesses of an exterior member of W/H diameter 1-5, W/H diameter 6-10, W/H diameter 11-15 of each kind of exteriors of no exterior, tape-wound 1, tape-wound 2, . . . . In FIG. 7, values of 10, 12, . . . , and the like are values of the longitudinal modulus of elasticity E of the wire harness in correspondence with predetermined kind of exterior and W/H diameter.

In FIG. 7, no exterior indicates a wire harness which is not provided with the exterior member of cable tie, tape or the like. Further, tape-wound 1 indicates a wire harness, for example, roughly wound with a tape of a predetermined kind, tape-wound 2 indicates a wire harness, for example, half-lapped with a predetermined kind of tape. Other than these, various kinds of exteriors are assumed by combinations of kinds of ways of winding of double half-lap, scroll-winding and the like, kinds of tapes, wound thicknesses and so on.

Further, in FIG. 7, W/H diameter 1-5, W/H diameter 6-10, W/H diameter 11-15 express boldnesses of respective wire harnesses by a unit of millimeter. The longitudinal moduli of elasticity E are calculated as described above respectively for all of combinations of kinds of exteriors and W/H diameters which are realistically feasible to form a data base.

Meanwhile, the transverse modulus of elasticity E can be expressed by Equation (8), shown below, when a measuring method shown in FIG. 6(B) is carried out.

$$G=(TL/\theta J)\times 2 \quad (8)$$

The polar moment of inertia J can be expressed by Equation (9), shown below, since the wire harness is assumed to have a circular section.

$$J=\pi D^4/32 \quad (9)$$

Further, torsional force can be expressed as follows.

$$T=TS \quad (10)$$

Therefore, the following equation is established.

$$G=(32FSL/\theta\pi D^4)\times 2=(F/\theta)\,(32SL/\pi D^4)\times 2 \quad (11)$$

Therefore, the polar modulus of elasticity G can be calculated by measuring a relationship between F and θ.

Each value of the transverse modulus of elasticity G can also be calculated for each kind and each boldness of the exterior member similar to the longitudinal modulus of elasticity E. In this case, each value in FIG. 7 is the transverse modulus of elasticity G of the wire harness in correspondence with a predetermined exterior kind and W/H diameter. Further, the transverse moduli of elasticity G are calculated as described above respectively for all of combinations of exterior kinds and W/H diameters which are realistically feasible to form a data base.

Incidentally, there is a relationship of Equation (12), shown below, between the transverse modulus of elasticity G and the longitudinal modulus of elasticity E.

$$G=E/2(1+\mu) \quad (12)$$

where notation μ designates Poisson's ratio.

Therefore, the transverse modulus of elasticity G can also be derived from the longitudinal modulus of elasticity E and Equation (12) by giving a pertinent Poisson's ratio μ. Conversely, the longitudinal modulus of elasticity E can also be derived from the transverse modulus of elasticity G. Further, the above-described measuring methods are only examples and respective values of the transverse modulus of elasticity G and the longitudinal modulus of elasticity E may be acquired by methods other than the above-described measurement examples.

Figure 8:
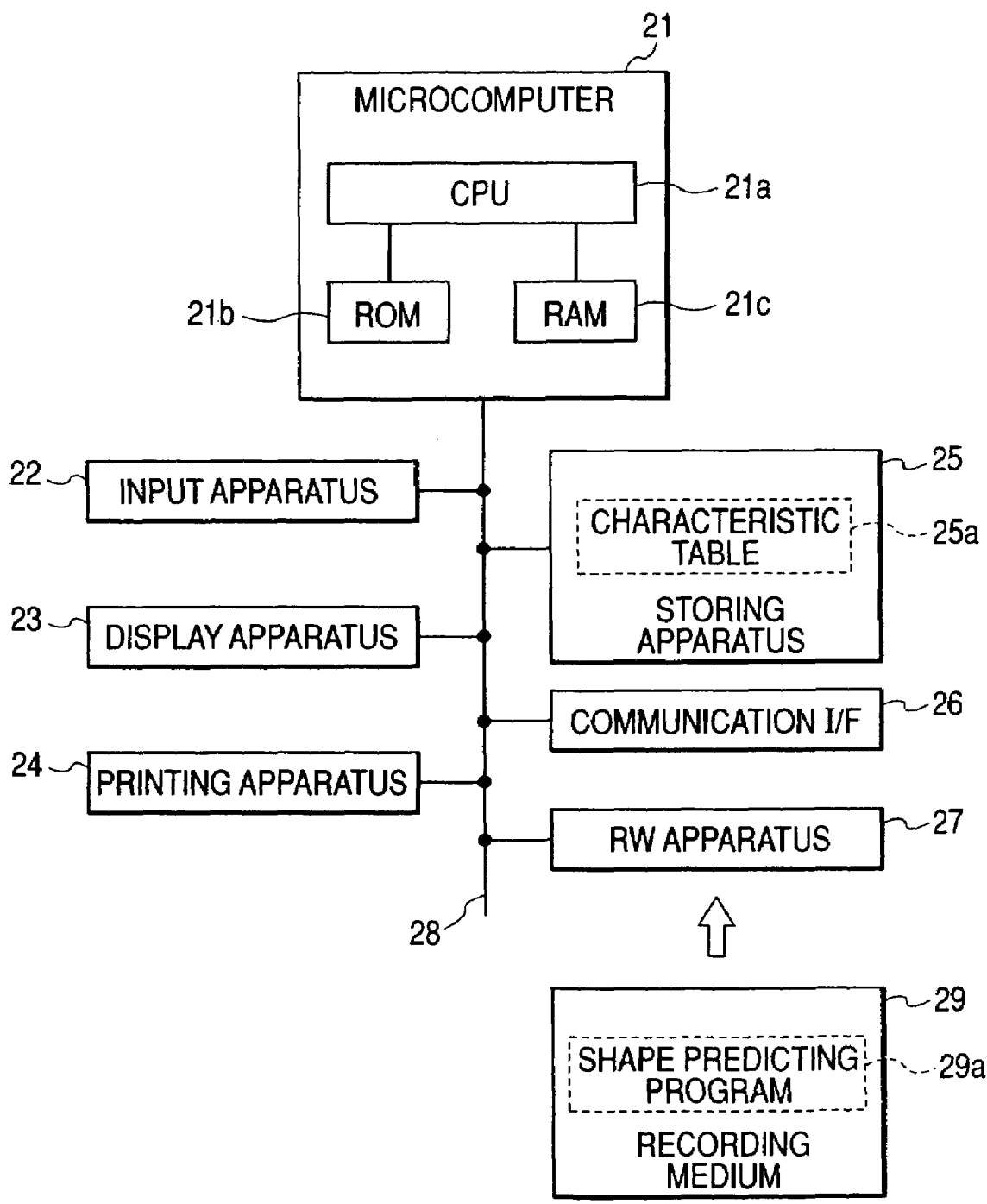
FIG. 8 is a block diagram showing an example of a hardware constitution according to the invention.

Next, an explanation will be given of a hardware constitution according to the embodiment for calculating and outputting the shape of the wire harness in accordance with a processing procedure, mentioned later, by utilizing the above-described theory and basic equations. FIG. 8 is a block diagram showing the hardware constitution according to the embodiment.

As shown by FIG. 8, according to the embodiment, there is used, for example, a personal computer constituted by including a microcomputer 21, an input apparatus 22, a display apparatus 23, a printing apparatus 24, a storing apparatus 25, a communication interface 26 and a read/write apparatus 27. The microcomputer 21 includes CPU 21a (central processing unit), ROM 21b for storing boot programs and the like, and RAM 21c for temporarily storing various processing results. The input apparatus 22 is a keyboard, a mouse or the like for inputting the above-described various values and the like, the display apparatus 23 is LCD, CRT or the like for displaying the processing results and the printing apparatus 24 is a printer for printing the processing results.

Further, the storing apparatus 25 is a hard disk drive for storing an installed wiring design assisting program 29a and a processing result by the program 29a, the communicating interface 26 is a modem board or the like for carrying out data communication with an external apparatus by using, for example, the internet, an LAN circuit or the like. The read/write apparatus 27 is an apparatus of reading the wiring design assisting program 29a stored in a record medium 29 of CD-ROM, DVD-ROM or the like and writing a calculation result by the wiring design assisting program 29a to the record medium 29. The respective constituent elements are connected via an inner bus 28.

The microcomputer 21 installs the wiring design assisting program 29a read by the read/write apparatus 27 to the storing apparatus 25. Further, when a power source is inputted, the microcomputer 21 is started in accordance with boot programs stored to ROM 21b to start the installed wiring design assisting program 29a. Further, the microcomputer 21 carries out processing with regard to wiring design assistance according to the invention in accordance with the wiring design assisting program 29a, outputs a processing result from the display apparatus 23 or the printing apparatus 24 and holds the processing result at the storing apparatus 25 or the record medium 29. The wiring design assisting program 29a can be installed also to other personal computer or the like having the above-described basic constitution and makes the computer function as wiring design assisting apparatus after having been installed. Further, the wiring design assisting program 29a may be provided not only from the record medium 29 but by way of a communication network of the internet, LAN or the like.

Figure 9:
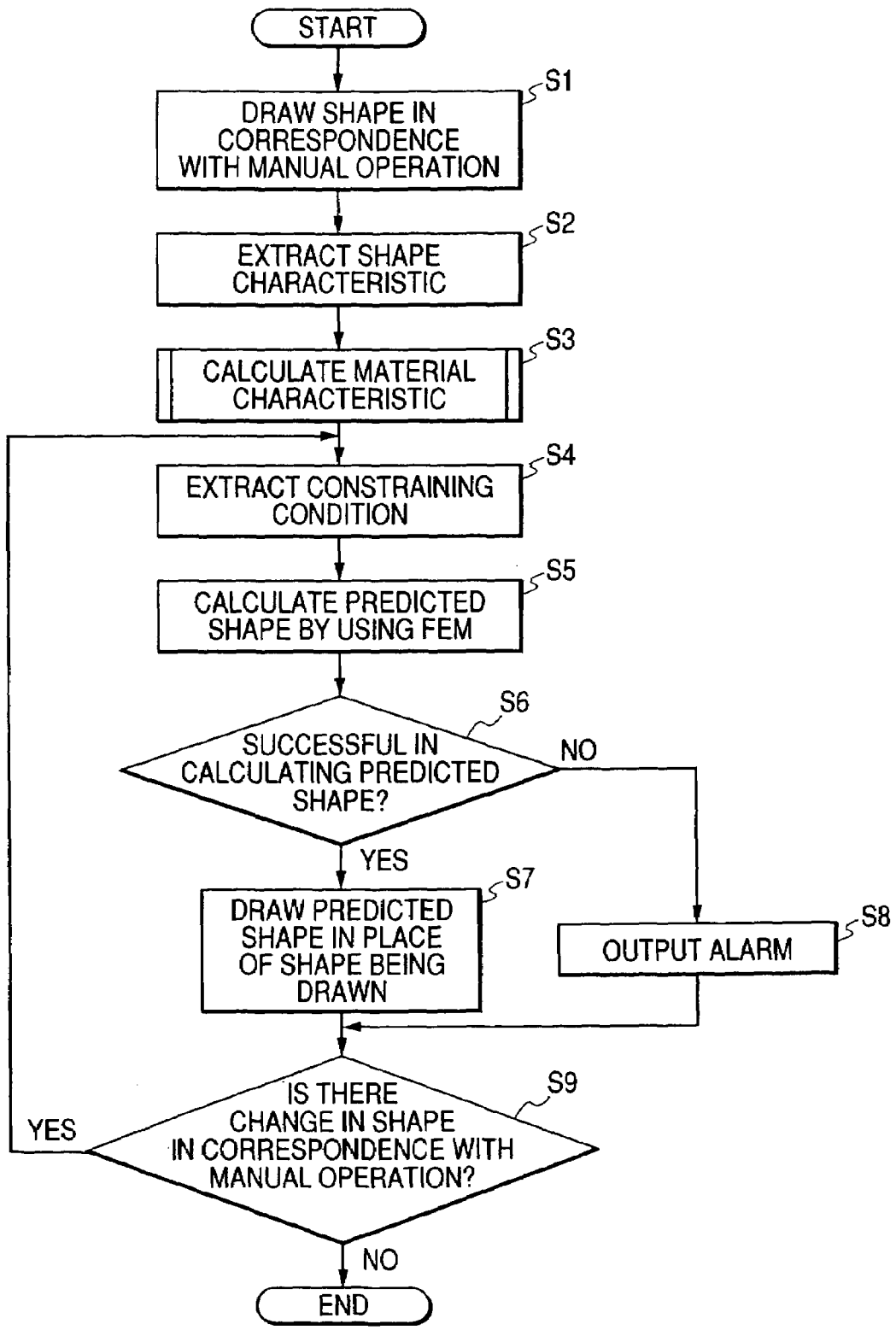
FIG. 9 is a flowchart showing a main processing procedure according to the invention.
Figure 10:
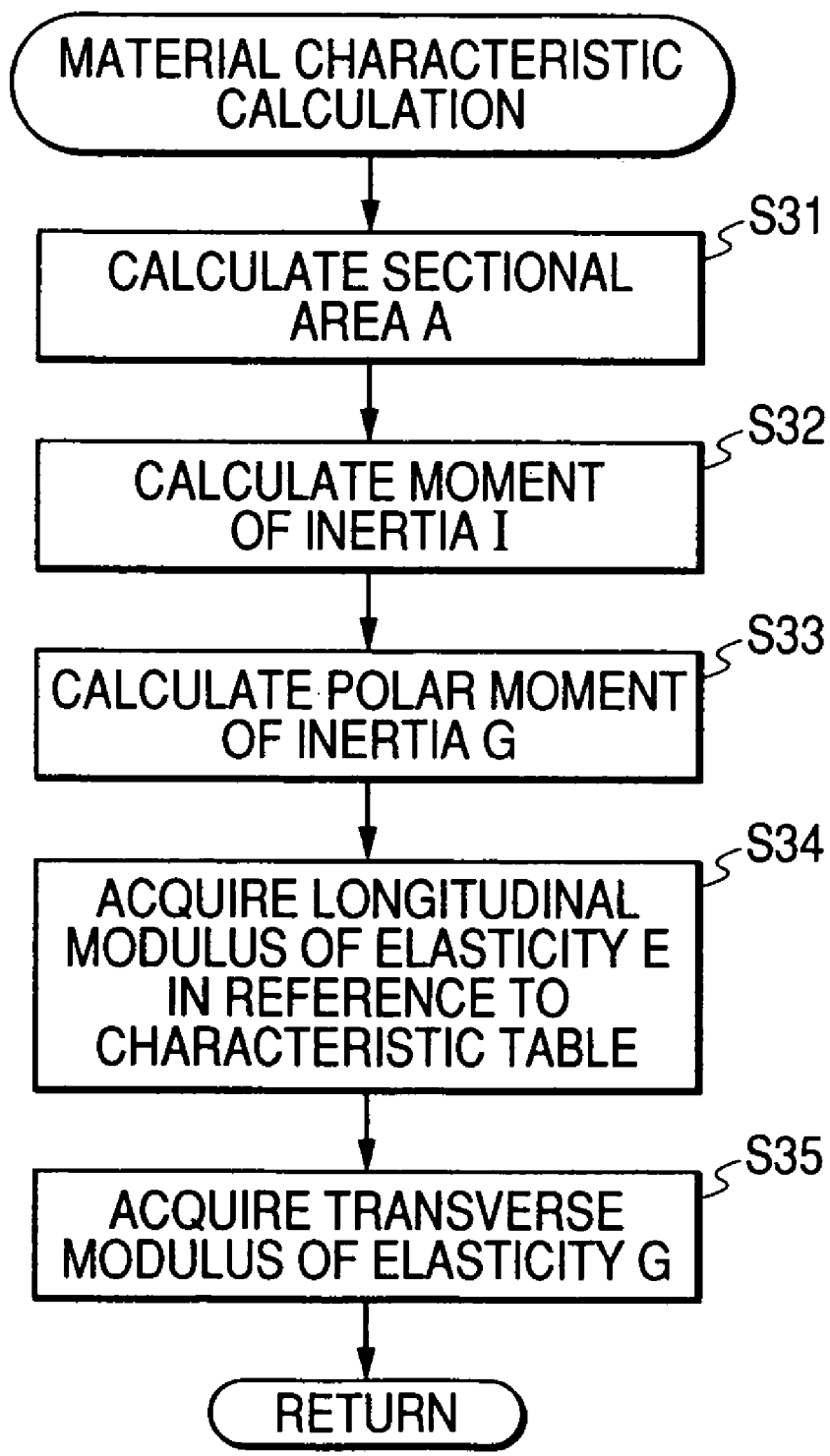
FIG. 10 is a flowchart showing a subroutine of calculating a material characteristic in the main processing procedure of FIG. 9.

Further, an explanation will be given of a processing procedure according to the embodiment in reference to FIG. 9 through FIG. 11. FIG. 9 is a flowchart showing a main processing procedure according to the invention which is carried out by using the hardware constitution shown in FIG. 8. FIG. 10 is a flowchart showing a subroutine of calculating the material characteristic in the main processing procedure of FIG. 9. FIG. 11 (A) through FIG. 11 (D) are respectively views exemplifying states of deforming the wire harness in the respective processing procedures of FIG. 9.

First, at step S1 shown in FIG. 9, a wire harness having an arbitrary shape is drawn in correspondence with manual operation. The step S1 is similar to a designing and drawing method using well-known CAD. That is, with respect to a shape of the wire harness in a straight state on the display apparatus 23 as shown by 1a of FIG. 11A, a mouse or the like as the input apparatus 22 is used, for example, an end portion thereof is displaced from 1a5 to 1b5 as shown by m1. Further, a shape of the wire harness having desired length and boldness as indicated by 1b of the drawing is drawn on the premise of being arranged in a predetermined three-dimensional space at inside of a vehicle (actually with an image as shown by, for example, FIG. 3(A)). At this occasion, the wire harness is drawn such that also the exterior kind explained in reference to FIG. 7 can be discriminated (actually, for example, with an image as shown by FIG. 3(A)). Further, a supporting member of a clip or the like is also drawn. Further, in this case, for simplicity, it is assumed that only an end portion designated by 1a1 is completely constrained and the end portion designated by 1a5 is deformable. Other portion is assumed to be completely free.

Figure 11A:
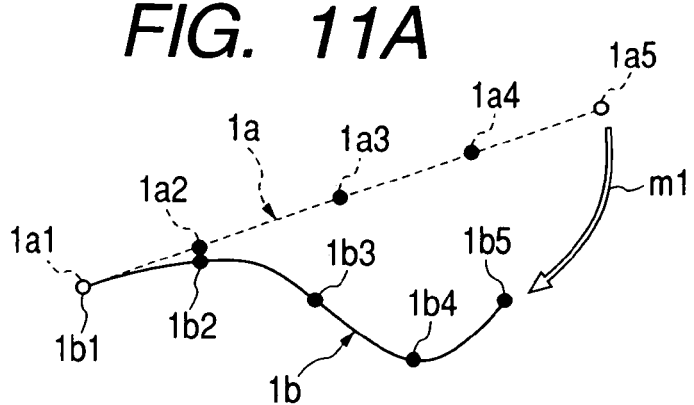
FIGS. 11A through 11E are views respectively exemplifying states of deforming the wire harness in respective processing procedures of FIG. 9.
Figure 11B:
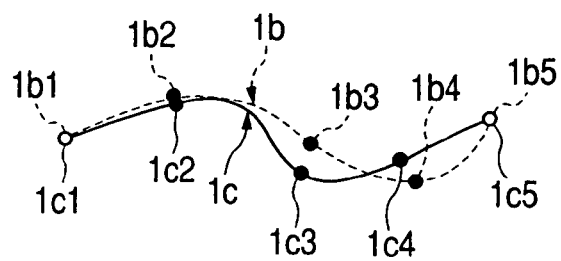
Figure 11C:
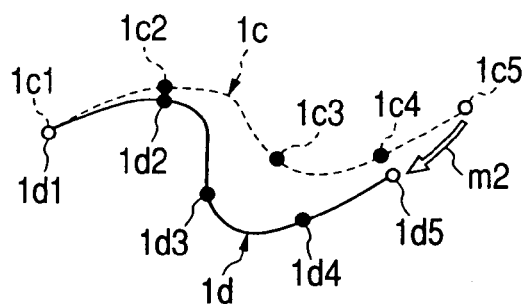
Figure 11D:
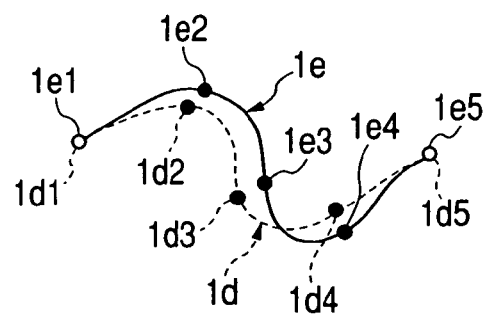

Further, portions designated by 1a1 through 1a5 in FIG. 11(A) are portions in correspondence with representative node points allocated when the wire harness is coupled with a plurality of beam elements to form a model. Portions respectively in correspondence with respective portions designated by 1a1 through 1a5 are designated as 1b1 through 1b5, 1c1 through 1c5, 1d1 through 1d5, 1e1 through 1e5 in FIG. 11(A) through FIG. 11(E). Further, step S1 corresponds to drawing step and drawing unit in claims.

Successively, at step S2, the shape characteristic is extracted from the shape 1b of the wire harness drawn at step S1. In details, the kind of the exterior member, the boldness and the length of the wire harness and so on are extracted from the shape 1b. Further, these are temporarily stored to a work area of RAM 21c for processings to be carried out thereafter. Step S2 corresponds to shape characteristic extracting step and shape characteristic extracting unit in claims.

Successively, at step S3, the material characteristic is calculated from the shape 1b of the wire harness drawn at step S1. In this case the material characteristic is constituted by the sectional area A, the moment of inertia I, the polar moment of inertia J, the longitudinal modulus of elasticity E and the transverse modulus of elasticity G included in respective elements of the rigidity matrix [K]. Step S3 corresponds to material characteristic calculating step and material characteristic calculating unit in claims.

In details, in calculating the material characteristic at step S3, as shown by FIG. 10, at step S31, first, the sectional area A is calculated. The sectional area A can be calculated based on the boldness of the wire harness extracted at step S2.

Next, at step S32, the moment of inertia I is calculated. The moment of inertia I can be calculated in accordance with the sectional area A calculated at step S31 and Equation (6), mentioned above. Next, at step S33, the polar moment of inertia J is calculated. The polar moment of inertia J can be calculated in accordance with the sectional area A calculated at step S31 and Equation (9), mentioned above.

Next, at step S34, the longitudinal modulus of elasticity E is acquired in reference to the characteristic table 25a previously stored in the storing apparatus 25. That is, the longitudinal modulus of elasticity E in accordance with the kind of the exterior member and the boldness of the wire harness extracted at step S2 can be acquired easily and firmly.

Further, the transverse modulus of elasticity G is acquired in reference to the characteristic table 25a at step S35. That is, the longitudinal modulus of elasticity E in accordance with the kind of the exterior member and the boldness of the wire harness extracted at step S2 can be acquired. Naturally, as described above, the transverse modulus of elasticity G may be derived from the longitudinal modulus of elasticity E by utilizing Equation (12).

When calculation of the material characteristic has been finished, successively, at step S4, the constraining condition is extracted. The constraining condition is constituted by kinds of constraint (completely constraint, rotatably constraint, completely free and the like) as shown by FIG. 2 at the allocated respective node points, coordinates of the end portion 1b1 which is completely constrained and the end portion 1b5 in the destination of deformation by m1 which are particularly important. Further, the respective values set here relate to the respective elements in the deformation vector {x} of the equation (3). Step S4 corresponds to constraining condition extracting step and constraining condition extracting unit in claims.

Successively, at step S5, a predicated shape is calculated by using a finite element method. That is, since the shape 1b of the wire harness shown in FIG. 11(A) is drawn simply by using CAD, the physical equilibrium state is not necessarily established to satisfy the shape characteristic, the material characteristic and the constraining condition and therefore, a predicted shape which is brought into the equilibrium state is calculated as shown by 1c of FIG. 11(B). Step S5 corresponds to predicted shape calculating step and predicted shape calculating unit in claims.

In calculation by using the finite element method, as shown by Equation (3) shown above, the wire harness is formed in to a model of coupling a plurality of beam elements and unknowns in the model are calculated by applying the shape characteristic, the material characteristic and the constraining condition to the model. That is, when unknowns in the displacement vector {x} are calculated, the predicted shape of the wire harness in the equilibrium state as shown by 1c is provided.

However, there can be also a case in which a solution of satisfying the shape characteristic, the material characteristic and the constraining condition is not provided. That is, there can also be a case in which the predicted shape brought into the physical equilibrium state as shown by 1c cannot be calculated. By assuming such a case, at step S6, success/unsuccess of the predicted shape calculation is determined.

At step S6, when it is determined to have succeeded in the predicted shape calculation (Y of step S6), the operation proceeds to step S7 and the predicted shape designated by 1c is drawn in place of the shape designated by 1b which is being drawn. That is, when the end portion of the wire harness is displaced at the input apparatus 22, a shape physically in equilibrium is automatically calculated by the finite element method and the shape is drawn again. That is, the shape physically in equilibrium is automatically calculated and drawn at the background by following shape design by well-known operation by CAD.

Meanwhile, at step S6, when the predicted shape calculation is determined to be unsuccessful (N of step S6), the operation proceeds to step S8 and an alarm stating that the predicted shape calculation is unsuccessful is outputted. The alarm may be displayed on the display apparatus 23 by characters or alarm sound may be emitted by sound emitting apparatus (not illustrated). Further, in this case, the shape of the wire harness which is being drawn designated by 1b stays to be displayed on the display apparatus 23. In this way, when the predicted shape physically in equilibrium cannot be calculated, the statement is alarmed and therefore, precise path design can be carried out in a shorter period of time. Step S8 corresponds to alarm outputting step and the alarm outputting unit in claims.

Successively, at step S9, presence or absence of a change in the shape in correspondence with manual operation is determined. For example, assume that the end portion is displaced from 1c5 to 1d5 as shown by m2 of FIG. 11(C) by operating the input apparatus 22 since an obstacle of an electric equipment or the like is present on the predicted shape designated by 1c. Then, the operation returns to step S4 (Y of step S9) to extract a new constraining condition. That is, coordinates of the end portion 1c5 are updated to coordinates of the end portion 1d5. Further, the operation proceeds to step S5 to carry out calculation using the finite element method again to thereby calculate a shape satisfying the new constraining condition as shown by 1e of FIG. 11(D).

Figure 11E:
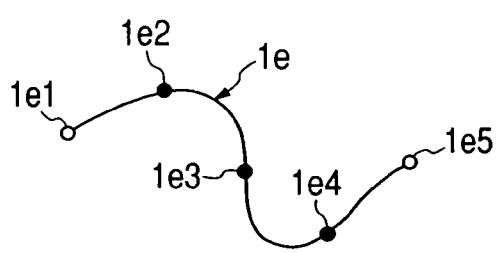

Further, as shown by FIG. 11(E), a shape of the wire harness designated by 1e is drawn on the display apparatus 23 in place of the shape designated by 1*d*. Naturally, the processings of step S4 through step S8 are repeated when there are changes in the shape in correspondence with manual operation again and again for some reason. When it is determined that there is not the change in the shape in correspondence with the manual operation (N of step S9), a series of the processings are finished. In finishing, the predicted shape 1*e* may be preserved in a hard disk or the like as the storing apparatus 25 or may be printed on paper from the printing apparatus 24.

Although according to the embodiment, node points other than the end portion are made to be completely free, the predicted shape may be calculated in consideration of influence of gravitational force. The influence of gravitational force relates to respective elements in the force vector {F} in Equation (3).

In this way, according to the embodiment of the invention, the wire harness is regarded to be the elastic body having the circular shape and coupled with the plurality of beam elements maintaining the linearity to form the model and therefore, an amount of calculation is considerably reduced and the shape can firmly be predicted in a short period of time. Further, data necessary for calculation of the finite element method is automatically calculated from the wire harness drawn in correspondence with manual operation and therefore, it is not necessary to input numerical values for calculating the predicted shape. Therefore, learning of special technique and skill are dispensed with.

Further, the method and the apparatus of the invention are not limited to the wire harness wired at inside of the vehicle but applicable similarly to a wire harness wired indoors. Further, the method and the apparatus is similarly applicable also to a wire harness having a plurality of branch lines branched from a trunk line.

According to the invention, the wire-like structure is regarded to be the elastic body having the circular section and coupled with the plurality of beam elements maintaining the linearity to form the model and therefore, in comparison with a general finite element model allocated with meshes, an amount of calculation is remarkably reduced. Therefore, the shape can be predicted firmly in a short period of time. Further, data necessary for calculation of the finite element method is automatically calculated from the wire-like structure which is drawn in correspondence with manual operation and therefore, it is not necessary to input numerical values for calculating the predicted shape. Therefore, learning of a special technique and skill are dispensed with.

According to the invention, the material characteristic necessary for calculation of the finite element method can easily and firmly be provided from the wire-like structure which is drawn in correspondence with manual operation by previously referring to the characteristic table in correspondence with the relationship among the kind, the boldness and the material characteristic of the exterior member.

According to the invention, the longitudinal modulus of elasticity and the transverse modulus of elasticity necessary for calculation of the finite element method can easily and firmly be provided from the wire-like structure which is drawn in correspondence with manual operation by referring to the characteristic table.

According to the invention, when the predicted shape physically in equilibrium cannot be calculated from the wire-like structure formed in correspondence with manual operation, the statement is alarmed and therefore, precise path design can be carried out in a shorter period of time.

What is claimed is:

1. A method of predicting, by utilizing a finite element method, a shape of a wiring structure in which the wiring structure constituted by a line streak member covered by an exterior member is regarded as an elastic body in which a plurality of beam elements a linearity of which is maintained are coupled with each other, the method comprising:
   a drawing step of drawing the wiring structure having an arbitrary shape by a manual operation;
   using a computer, performing:
      a shape characteristic extracting step of extracting shape characteristic from the drawn wiring structure;
      a constraining condition extracting step of extracting constraining condition from the drawn wiring structure;
      a material characteristic calculating step of calculating material characteristic of the drawn wiring structure based on the drawn wiring structure;
      a predicted shape calculating step of calculating a predicted shape which is brought into a physical equilibrium state by applying the shape characteristic, the constraining condition and the material characteristic to the finite element method; and
      a preserving step comprising one or more of: (1) storing the predicted shape in a storing apparatus, and (2) printing the predicted shape from a printing apparatus.

2. The method according to claim 1, wherein a characteristic table representing relationships among type, boldness and material characteristic of the exterior member is previously stored, and
   wherein the material characteristic calculating step calculates the material characteristic of the drawn wiring structure by applying type and boldness of the exterior member calculated based on the drawn wire harness to the characteristic table.

3. The method according to claim 2, wherein in the characteristic table, longitudinal modulus of elasticity or transverse modulus of elasticity of the exterior member is treated as the material characteristic of the exterior member.

4. The method according to claim 1 further comprising:
   an alarm outputting step of outputting an alarm when it is determined that the predicted shape which is brought into the physical equilibrium state is impossible to be calculated based on the wiring structure drawn according to the manual operation.

5. An apparatus of predicting, by utilizing a finite element method, a shape of a wiring structure in which the wiring structure constituted by a line streak member covered by an exterior member is regarded as an elastic body in which a plurality of beam elements a linearity of which is maintained are coupled with each other, the apparatus comprising:
   a drawing unit for drawing the wiring structure having an arbitrary shape by a manual operation;
   a shape characteristic extracting unit for extracting shape characteristic from the drawn wiring structure;
   a constraining condition extracting unit for extracting constraining condition from the drawn wiring structure;
   a material characteristic calculating unit for calculating material characteristic of the drawn wiring structure based on the drawn wiring structure;
   a predicted shape calculating unit for calculating a predicted shape which is brought into a physical equilibrium state by applying the shape characteristic, the constraining condition and the material characteristic to the finite element method; and
   a storage;

wherein said predicted share is calculated, and stored in the storage.

6. A computer readable recording medium storing a program which cause a computer to function as an apparatus of predicting, by utilizing a finite element method, a shape of a wiring structure in which the wiring structure constituted by a line streak member covered by an exterior member is regarded as an elastic body in which a plurality of beam elements a linearity of which is maintained are coupled with each other, the program causing the computer to function as:

a drawing unit for drawing the wiring structure having an arbitrary shape by a manual operation;

a shape characteristic extracting unit for extracting shape characteristic from the drawn wiring structure;

a constraining condition extracting unit for extracting constraining condition from the drawn wiring structure;

a material characteristic calculating unit for calculating material characteristic of the drawn wiring structure based on the drawn wiring structure; and a predicted shape calculating unit for calculating a predicted shape which is brought into a physical equilibrium state by applying the shape characteristic, the constraining condition and the material characteristic to the finite element method.

* * * * *